Sept. 21, 1954  M. W. MARIEN  2,689,774
PISTON RING
Filed Nov. 15, 1950
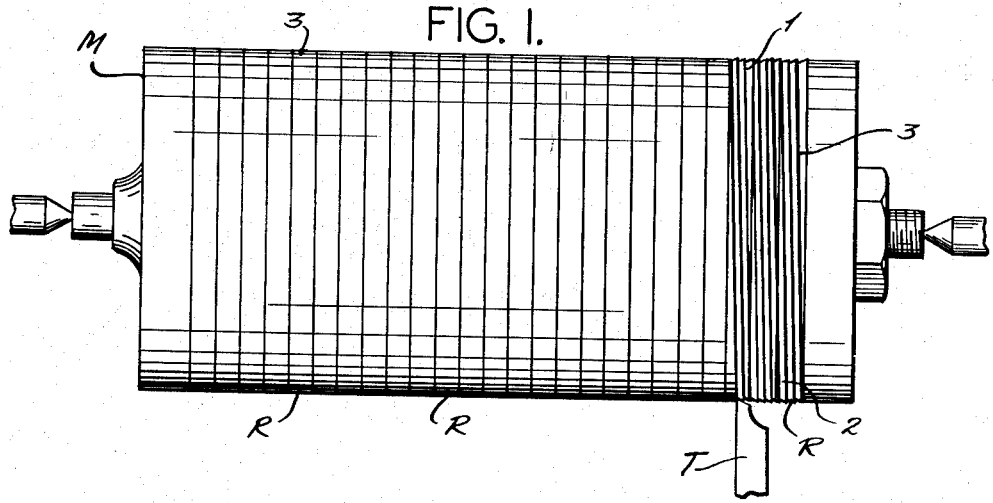
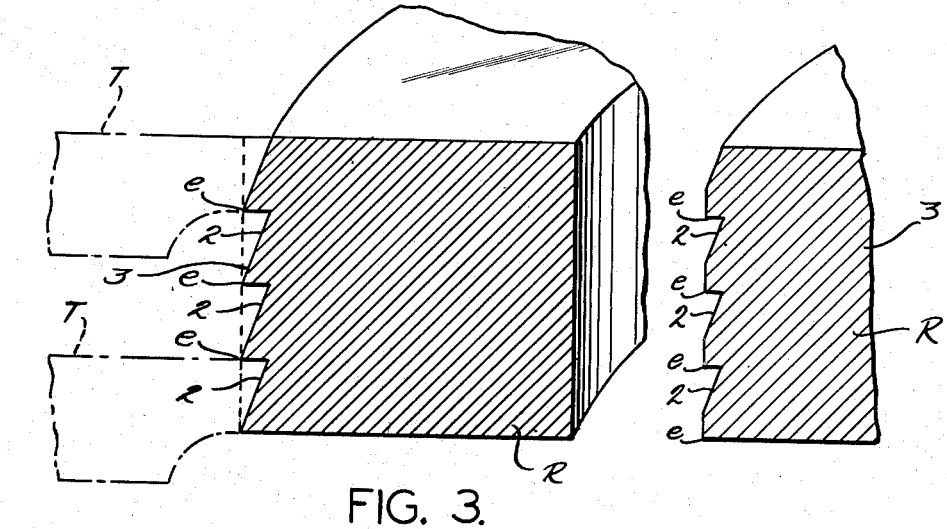
INVENTOR.
MELVIN W. MARIEN
BY
ATTORNEY.

Patented Sept. 21, 1954

2,689,774

UNITED STATES PATENT OFFICE 2,689,774

PISTON RING

Melvin W. Marien, Richmond Heights, Mo., assignor to Ramsey Corporation, Cleveland, Ohio, a corporation of Ohio Application November 15, 1950, Serial No. 195,874

2 Claims. (Cl. 309—45)

My invention has relation to improvements in piston packing rings for internal combustion engines and the method of making same, and it consists in the novel features of construction more fully set forth in the specification and pointed out in the claims.

The invention is directed primarily to piston rings for replacement purposes in worn cylinders which are not reconditioned by grinding or boring.

It is a matter of common knowledge that after a long period of use cylinders become so highly polished that they are, in effect, glazed. This glassy surface prevents the breaking in of new rings as they slide freely over the glazed surface with insufficient friction to produce abrasion. I have sought to overcome this difficulty by forming an abrading surface on the cylinder contacting face of the ring that will act on the cylinder in the nature of a file to cut through the glazing and expose a new cylinder surface similar in physical characteristics to that of a new cylinder.

It is, therefore, the principal object of the invention to provide a piston ring having an abrading surface capable of attacking the glazed cylinder wall to permit mutual initial wear of cylinder and ring whereby the latter becomes seated to function effectively as a packing for both compression and oil.

It is a further object to provide a piston ring having a continuous helical groove of a plurality of turns and with an inclined bottom so that, in cross-section, the collective turns of the groove have the shape of a ripsaw in cross-section. The single helical groove operates in effect as a plurality of tapered cylinder contacting faces.

Other advantages of the invention will be better apparent from a detailed description thereof in connection with the accompanying drawings, in which:

Figure 1 shows a multiplicity of piston rings mounted on a rotatable mandrel and a cutting tool applied to the rings for machining as herein described; Fig. 2 is an enlarged cross-section and perspective view of a fragment of my improved ring with the cutting tool shown in dot and dash at the beginning and end of the tooling operation; Fig. 3 is a side elevation of the ring with part broken away; and Fig. 4 shows a cross-section of the ring after use and thoroughly broken in.

Referring to the drawings, M represents a rotatable mandrel on which are mounted a multiplicity of cast iron piston rings R, R, etc. undergoing processing. The operation shown (Fig. 1) is the cutting of a helical groove 1 in each ring R by a cutting tool T. The tool T is applied to the rings at one end of the rotating mandrel M and moved steadily to the opposite end of the mandrel whereby all the rings R are grooved in a single continuous operation.

The tool T is shaped so as to cut a groove 1 with an inclined bottom 2, which groove is continuous over the entire face 3 of the ring R. Obviously, the forming of groove 1 results in a sharp helical edge e winding around the outer face of the ring which edge forms the cylinder contacting part of the ring when the ring is mounted in a piston for operation within an engine cylinder.

The very limited contact thus provided between ring and cylinder wall insures high unit pressure with low total pressure—an ideal condition for oil control. The multiple turn cylinder contacting edge e also prevents the cylinder pressure unseating the ring from the cylinder wall and thus prevents blow-by.

Having described my invention, I claim:

1. A piston ring comprising an annulus having a continuous helical groove in the outer circumferential surface thereof, said groove opening to the top and bottom of the ring and adapted to carry oil downwardly for discharge from the bottom of the ring, said groove having a sharp abrading multi-turn edge at the outer circumference of the ring, said edge having a uniform diameter to provide a continuous abrading line contact with a cylinder wall in which the piston ring operates, said line contact extending along a plurality of spaced turns to provide with the cylinder wall a helical chamber open only at the ends of the helix and extending throughout the width of the ring, whereby a sharp abrading edge will contact the cylinder wall and be effective to remove glaze therefrom and break in the ring by wearing down the line contact surface thereof to flat cylinder wall engaging faces.

2. A piston ring comprising a split cast iron annulus having a continuous helical groove formed in the outer circumferential surface thereof and opening to the top and bottom of the ring for carrying oil downwardly for discharge from the bottom of the ring, the bottom of said groove being a continuous uninterrupted inclined surface terminating in an exterior substantially line contact sharp abrading multi-turn edge of uniform diameter and having continuous abrading contact with the cylinder wall along a plurality of spaced turns to provide with the cylinder wall a helical chamber open only at the ends of the helix and extending throughout the width of the ring, said sharp abrading multi-turn edge removing glaze from the cylinder wall and accommodating quick wear in of the ring by wearing down the line contact surface thereof to flat cylinder wall engaging surfaces adapted to effectively function as a compression and oil packing.

References Cited in the file of this patent

UNITED STATES PATENTS

| Number | Name | Date |
| --- | --- | --- |
| 1,215,775 | Campbell | Feb. 13, 1917 |
| 1,219,270 | Dunham | Mar. 13, 1917 |
| 1,254,720 | Mummert | Jan. 29, 1918 |
| 1,477,120 | Hanson | Dec. 11, 1923 |
| 1,585,422 | Seifert | May 18, 1926 |
| 1,705,648 | Schmidt | Mar. 19, 1929 |
| 1,911,755 | Grover | May 30, 1933 |
| 2,079,977 | Wenzel | May 11, 1937 |
| 2,287,884 | Jominy | June 30, 1942 |